United States Patent [19]
Boudouris et al.

[11] 3,718,388
[45] Feb. 27, 1973

[54] PICK-OFF DEVICE
[75] Inventors: Angelo Boudouris, Sylvania; Harold M. Plumadore, Toledo, both of Ohio
[73] Assignee: Eprad Incorporated, Toledo, Ohio
[22] Filed: Dec. 20, 1971
[21] Appl. No.: 209,601

Related U.S. Application Data
[63] Continuation-in-part of Ser. No. 873,394, Nov. 3, 1969, Pat. No. 3,639,046.

[52] U.S. Cl. ..........................352/92, 352/7, 352/133
[51] Int. Cl. ..............................................G03b 21/50
[58] Field of Search............................352/92, 133, 7

[56] References Cited

FOREIGN PATENTS OR APPLICATIONS
157,122   4/1952   Australia................................352/92

*Primary Examiner*—Samuel S. Matthews
*Assistant Examiner*—Monroe H. Hayes
*Attorney*—Carl F. Schaffer et al.

[57] ABSTRACT

A universal pick-off device for a motion picture projector which can be substituted directly for a back-up roller associated with a driven sprocket in the projector. The pick-off device can be installed without modification in almost any commercial projector. Adjustment apparatus is provided for aligning the pick-off device with the sprocket. When a conducting tab or strip on the edge of a motion picture film completes a circuit between the pick-off device and the sprocket, an impulse signal is provided for external controls which can, for example, change to a second projector at the end of a film reel, lower or raise the lights, control background music, open or close curtains, etc.

9 Claims, 5 Drawing Figures

PATENTED FEB 27 1973
3,718,388
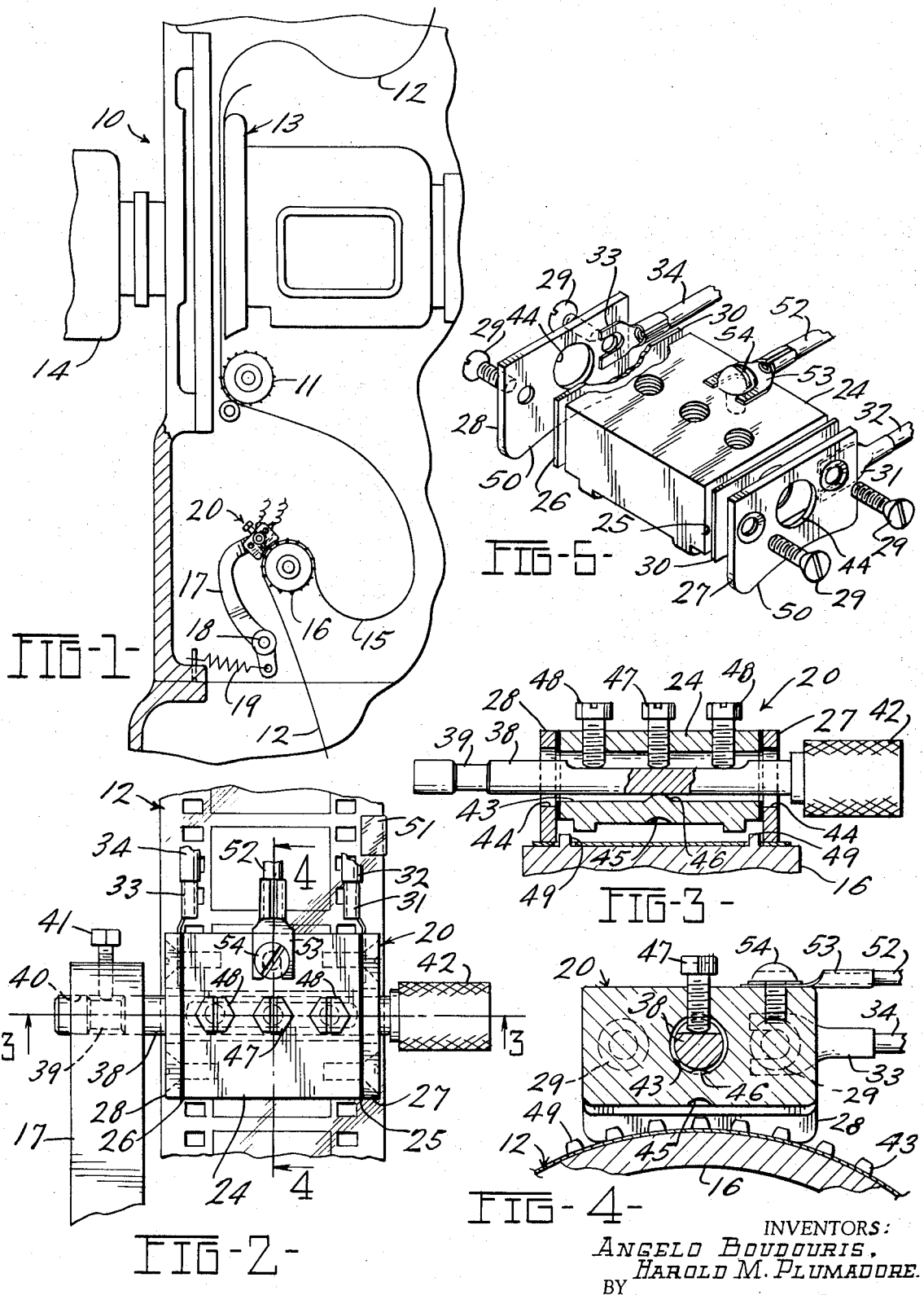
FIG-1-
FIG-2-
FIG-3-
FIG-4-
FIG-5-
INVENTORS:
ANGELO BOUDOURIS,
HAROLD M. PLUMADORE.
BY
ATT'YS 3,718,388

PICK-OFF DEVICE

CROSS-REFERENCE TO RELATED APPLICATION

This is a continuation-in-part of our copending application, Ser. No. 873,394 filed Nov. 3, 1969, now U.S. Pat. No. 3,639,046, issued Feb. 1, 1972.

BACKGROUND OF THE INVENTION

This invention relates to a pick-off device and, more particularly, to an improved device for mounting in a motion picture projector to detect electrically conductive control markers on motion picture film passing through the projector.

There has been a trend in recent years toward automated projection booths for motion picture theaters. By employing larger reels of film, each lasting an hour or more, it is possible for a complete show to be projected with no more than one reel change-over. The reel change-over can be accomplished automatically by a signal produced at the end of the film on one reel which is effective to start the second projector and to turn off the first at the appropriate time. More elaborate controls have been recently introduced for performing other functions in response to signals effected by the film. Thus, the house lights can be automatically lowered at the beginning of a show and raised at the end. The stage curtain can also be automatically operated, if desired. In addition, background music may be turned on and off at appropriate times during, before and after the film and during intermissions.

Heretofore, pick-off devices mounted on motion picture film projectors to produce electrical control signals in response to a tab or strip carried by the film have been quite elaborate and costly. Further, installation of such devices on existing projectors has also required substantial devices on existing projectors has also required substantial modification thereof, involving considerable time and expense.

SUMMARY OF THE INVENTION

The present invention provides an improved pick-off device which is comparatively simple and, further, can be easily installed on almost any commercial motion picture projector without requiring any special modification thereof. The new pick-off device is designed to be installed in place of a back-up roller employed to maintain film in contact with a driven sprocket in the projector. Installation of the pick-off device is accomplished simply by removing the back-up roller, usually by loosening a set screw, and inserting the pick-off device in the same opening in which the back-up roller was mounted. The pick-off device is adjustable to enable it to be accurately aligned with the driven sprocket. The pick-off device generally comprises a body portion supporting a pair of electrically conducting shoes which are shaped and spaced to urge edges of the film into contact with the driven sprocket. Electrically conductive foil strips placed on the edge of the film selectively complete a circuit between the shoes and the driven sprocket for generating control signals. The shoes are electrically insulated from each other for generating different control signals when either or both shoes are connected to the sprocket.

A shaft is positioned within an enlarged diameter opening extending through the body and the shoes and the shaft are attached to the body by means of a first set screw or other suitable retaining means. The set screw is located adjacent the center of the body. Opposite the set screw, a fulcrum or bump is formed in a wall of the opening such that the shaft may be rocked or tilted within the opening. A pair of set screws are threaded into the body opposite the fulcrum and spaced on opposite sides of the first set screw for fixing the position of the body and the shoes with respect to the shaft. Thus, by selectively turning in the two screws, the shoes may be rotated about the fulcrum to a position where both shoes simultaneously engage edges of the film with equal pressure. The shaft extends from one end of the opening through the body and the shoes for engaging the back-up roller support.

An electrical connection is made to each shoe for generating a signal when such shoe is electrically connected to the associated driven sprocket. An electrical connection may also be made to the body for forming a ground connection to the projector. Thus, when a conductive strip on one side of the film connects the shoe engaging that side of the film to the sprocket, a connection is made between the ground wire connected to the body and the wire connected to such shoe. If the film should break, both shoes may be simultaneously connected through the sprocket to the ground wire. The resulting signal may be used to stop the projector. Or, in a preferred embodiment, the shoes may be slightly spaced from the sprocket to prevent an erroneous signal in the event of a torn film edge.

It is, therefore, a principal object of the invention to provide an improved pick-off device for use in a motion picture film projector and having the advantages discussed above.

Another object of the invention is to provide an improved pick-off device which may be readily mounted in a projector by mounting in a support for a back-up roller.

Other objects and advantages of the invention will become apparent from the following detailed description, with reference being made to the accompanying drawings.

BRIEF DESCRIPTION OF THE DRAWINGS

FIG. 1 is a fragmentary view in elevation of a portion of a motion picture projector incorporating a pick-off device constructed in accordance with the present invention;

FIG. 2 is a top plan view of a pick-off device manufactured in accordance with the present invention and showing the means for mounting the device in a conventional motion picture projector;

FIG. 3 is a cross-sectional view taken along line 3—3 of FIG. 2;

FIG. 4 is a cross-sectional view taken along line 4—4 of FIG. 3; and

FIG. 5 is an exploded view in perspective showing assembly of the shoes to the body of a pick-off device constructed in accordance with the present invention.

DESCRIPTION OF THE PREFERRED EMBODIMENT

Turning now to the drawings and particularly to FIG. 1, a fragmentary portion of a motion picture projector 10 is shown. A sprocket 11 is intermittently driven to pull a film 12 between a shutter mechanism 13 and a lens assembly 14. From the intermittently driven sprocket 11, the film passes through a free loop 15, over a constant speed driven sprocket 16, through a soundhead (not shown) and onto a take-up reel (also not shown). Suitable mechanism such as an arm 17, is provided for mounting a conventional back-up roll (not shown) for biasing film into contact with the driven sprocket 16. The arm 17 is shown, for example, mounted to pivot on a pin 18 and a spring 19 is provided for urging the back-up roller against the driven sprocket 16. In place of the back-up roll, a pick-off device 20 constructed in accordance with the present invention has been mounted on the arm 17. It will, of course, be appreciated that the pick-off device 20 may replace any one of a number of back-up rollers in a conventional motion picture projector.

Turning now to FIGS. 2-5, the pick-off device 20 is shown in detail. The pick-off device 20 generally comprises a body 24 having a pair of parallel spaced ends 25 and 26 for mounting a pair of shoes 27 and 28, respectively. The shoes 27 and 28 are attached to the body 24 by any conventional means, for example, by means of screws 29 which are threaded into the body 24.

Although the body 24 of the pick-off device 20 may be of any suitable material, it is preferably constructed from metal to give it sufficient rigidity. If the body 24 is constructed from an electrical conductor such as aluminum, insulating sheets 30 are positioned between the shoe 27 and the body end 25 and between the shoe 28 and the body end 26. The screws 29 are also constructed from a non-conducting material such as nylon to insulate the shoes 27 and 28 from the body 24. A terminal 31 is connected to the shoe 27, as by clamping between the insulating sheet 30 and the shoe 27, to establish an electrical connection between the shoe 27 and a wire 32. Similarly, a terminal 33 is clamped between the other insulating sheet 30 and the shoe 28 to establish an electrical connection between the shoe 28 and a wire 34. The wires 32 and 34 are connected to control apparatus which is operated from signals generated by the pick-off device 20.

As best shown in FIGS. 3 and 4, the body 24 of the pick-off device 20 is mounted on a shaft 38. The shaft 38 includes a constricted diameter portion 39 adapted for mounting on the arm 17 in the projector 10. The shaft 38 may be mounted in an opening 40 in the arm 17 and held in place by means of a retainer such as a set screw 41 which engages the constricted shaft portion 39. The set screw 41 should be tightened sufficiently to prevent movement of the shaft 38 in the opening 40 when the shoes 27 and 28 are aligned with the sprocket 16. The shaft 38 is provided with an integral knurled knob 42. The knob 42 may be used to pivot the arm 17 and the pick-off device 20 away from the sprocket 16 to facilitate threading the film 12 through the projector 10.

The shaft 38 extends through an opening 43 in the body 24 and through aligned openings 44 in the shoes 27 and 28. The opening 43 in the body 24 is larger in diameter than the diameter of the shaft 38 to permit a rocking movement of the body 24 on the shaft 38 for aligning the shoes 27 and 28 with the sprocket 16. The body 24 is deformed by punching at the point 45 to form a fulcrum 46 in the wall of the opening 43 about midway between the shoes 27 and 28. Or, other obvious means may be provided to form the fulcrum 46. Above the fulcrum 46, the shaft 38 is attached to the body 24 by means of a pointed set screw 47. The set screw 47 presses the shaft 38 against the fulcrum 46 to prevent axial movement of the shaft 38. A pair of adjustment screws 48 are threaded into the body 24 on opposite sides of the set screw 47 to engage the side of the shaft 38 opposite the fulcrum 46. The shaft 38 may be flattened at the points of contact with the adjustment screws 48 to prevent rotation of the body 24 about the axis of the set screw 46 when the adjustment screws 48 are tightened. By selectively tightening one of the adjustment screws 48, the shaft 38 may be rocked or rotated about the fulcrum 46 within the opening 43 until both shoes 27 and 28 press the edges of the film 12 uniformly against the sprocket 16.

To use the pick-off device 20, a back-up roller is removed from the projector 10 after loosening the set screw 41 and the pick-off device 20 is mounted in its place. The set screw 41 is tightened into the recess 39 on the shaft 38 after the shoes 27 and 28 are positioned to contact edges of the film 12 outside of teeth 49 on the sprocket 16. Each of the shoes 27 and 28 is provided with a polished surface 50 for engaging the film 12 and having a suitable curvature for pressing the film against the sprocket 16. When the shaft 38 is initially attached to the arm 17, the shoes 27 and 28 may not both contact edges of the film 12. The screws 48 are then adjusted to rock or rotate the body 24 about the fulcrum 46 until both shoes 27 and 28 uniformly contact the edges of the film 12.

In operation of the projector 10, conductive strips of foil are attached around edges of the film 12 at suitable points in the show where control signals are to be generated. As shown in FIG. 2, a strip of conductive foil 51 is wrapped around the edge of the film 12 adjacent the shoe 27. When the foil 51 passes under the shoe 27, the shoe 27 is electrically connected to the sprocket 16 which may be an electrical ground. The signal generated by the foil 51 connecting the shoe 27 to ground may be used, for example, for switching projectors at the end of the film segment on the projector 10 or for stopping the projector 10 at a suitable intermission point in the film. Similar control signals will be generated by an electrical conductor placed around the edge of the film which passes under the shoe 28.

Any suitable ground connection may be made to the sprocket 16 in the projector 10. However, it has been found that when the body 24 of the pick-off device 20 is of metal, a ground wire 52 may be connected to the body 24 by means of a terminal 53 and a screw 54. The ground connection to the sprocket 16 is then completed through the shaft 38, the arm 17 and the housing of the projector 10. In the event of a breakage of the film 12, it will be apparent that both of the shoes 27 and 28 may be biased to come into contact with the sprocket 16. In this event, both of the wires 32 and 34 will be connected to the ground wire 52 to generate a control signal indicating either breakage or the end of the film 12. Or, in a preferred embodiment, a stop (not shown) is provided to prevent contact between the shoes 27 and 28 and the sprocket 16. If the film has a thickness of 0.006 inch and the foil wrapped around the edge of the film has a thickness of 0.0015 inch, then the total thickness of two layers of foil and the film is 0.009 inch. In this case, it is desirable to adjust the stop such that both shoes are spaced 0.005 inch from the sprocket. In operation, a slight pressure will be applied to the film, while film wear is minimal.

It will be appreciated that various changes and modifications may be made in the above-described embodiment of the pick-off device 20 without departing from the spirit and the scope of the claimed invention. The shaft 38, for example, may be attached to the body by a pin or by other suitable means in place of the screw 47. The pin may act as a pivot or fulcrum or it may bend as the screws 48 are adjusted.

What we claim is:

1. A pick-off device for mounting in a motion picture projector in place of a back-up roll which urges film towards a sprocket comprising, in combination, a pair of electrically conductive shoes, means including a member mounting said shoes in a spaced relationship for contacting edges of film passing through the projector, said mounting means including means for electrically insulating said shoes from each other and from the projector, a shaft having a predetermined diameter and an end adapted for mounting in the projector in place of the back-up roll, said mounting member having an opening therethrough of a diameter larger than said predetermined diameter, means attaching said shaft in said opening for limited pivotal movement while restraining said shaft from axial and rotational movement, means for adjusting the pivotal position of said mounting member on said shaft to align said shoes with the sprocket whereby said shoes uniformly urge the film towards the sprocket, and means for generating control signals when either or both of said shoes are electrically connected to the sprocket.

2. A pick-off device, as defined in claim 1, wherein said means attaching said shaft in said opening includes a fulcrum projecting from the wall of said opening substantially midway between said shoes, and a set screw threadably engaging said member and projecting into said opening opposite said fulcrum whereby said shaft is pinched between said set screw and said fulcrum.

3. A pick-off device, as defined in claim 2, wherein said adjusting means comprises a pair of adjustment screws threadably engaging said member, said pair of adjustment screws spaced on opposite sides of said set screw and said adjustment screws engaging the side of said shaft opposite said fulcrum.

4. A pick-off device, as defined in claim 3, wherein said member is an electrical conductor, and wherein said mounting means includes an electrical insulator between each of said shoes and said member.

5. A pick-off device, as defined in claim 4, wherein said signal generating means includes first and second wires, means connecting said first wire to one of said shoes, means connecting said second wire to the other of said shoes, a ground wire, and means connecting said ground wire to said member.

6. A pick-off device, as defined in claim 1, wherein said signal generating means includes first and second wires, means connecting said first wire to one of said shoes, means connecting the other of said wires to the other of said shoes, a ground wire, and means for electrically connecting said ground wire to the sprocket in the projector.

7. A pick-off device, as defined in claim 1, wherein said means for adjusting the pivotal position of said member on said shaft includes a pair of adjustment screws threadably engaging said member to contact a side of said shaft on opposite sides of said attaching means whereby said member is pivoted by selectively turning said adjustment screws.

8. A pick-off device, as defined in claim 7, wherein the portions of said shaft which are contacted by said adjustment screws are flat.

9. A pick-off device, as defined in claim 1, wherein said means attaching said shaft to said member includes a pin.

* * * * *